(12) United States Patent
Mao (10) Patent No.: US 10,865,894 B2
(45) Date of Patent: Dec. 15, 2020

(54) FOUR-WAY VALVE FOR BACKFLUSH FILTER SYSTEM

(71) Applicant: Gaowen Mao, Guangzhou (CN)

(72) Inventor: Gaowen Mao, Guangzhou (CN)

(*) Notice: Subject to any disclaimer, the term of this patent is extended or adjusted under 35 U.S.C. 154(b) by 0 days.

(21) Appl. No.: 16/585,632

(22) Filed: Sep. 27, 2019

(65) Prior Publication Data

US 2020/0025298 A1 Jan. 23, 2020

Related U.S. Application Data

(63) Continuation of application No. PCT/CN2018/079223, filed on Mar. 16, 2018.

(30) Foreign Application Priority Data

Mar. 28, 2017 (CN) .......................... 2017 1 0194602

(51) Int. Cl.
*F16K 11/085* (2006.01)
*F16K 11/076* (2006.01)
*B01D 29/66* (2006.01)

(52) U.S. Cl.
CPC ........ *F16K 11/0853* (2013.01); *F16K 11/076* (2013.01); *B01D 29/668* (2013.01); *B01D 2313/18* (2013.01); *B01D 2321/04* (2013.01)

(58) Field of Classification Search
CPC ............... F16K 11/0853; F16K 11/076; Y10T 137/86493
See application file for complete search history.

(56) References Cited

U.S. PATENT DOCUMENTS

| | | | | |
|---|---|---|---|---|
| 3,221,888 | A | * | 12/1965 | Muller ................... B01D 29/46 210/333.1 |
| 3,316,937 | A | | 5/1967 | Friedman |
| 3,679,060 | A | * | 7/1972 | Smith ..................... B01D 35/12 210/333.1 |
| 3,935,108 | A | * | 1/1976 | Forgues ................. B01D 35/00 210/340 |

(Continued)

FOREIGN PATENT DOCUMENTS

| | | |
|---|---|---|
| CN | 102042427 A | 5/2011 |
| CN | 103090052 A | 5/2013 |

(Continued)

*Primary Examiner* — Kevin R Barss
(74) *Attorney, Agent, or Firm* — Erson IP (Nelson IP)

(57) ABSTRACT

A four-way valve for a backflush filter system comprises a valve body (3) and a rotating valve core (2) having a valve rod at one end of a central shaft. A valve core port IV (16) is arranged at the other end of the central shaft of the valve core (2). Three ports are arranged in the radial direction of the valve core (2): a valve core port I (13), a valve core port II (14) and a valve core port III (15). The valve body (3) encasing the valve core (2) also has four ports. Three radial ports are respectively a valve body port I (9), a valve body port II (10) and a valve body port III (11), and the other port is an axial valve body port IV (12). By increasing the sizes of the relevant ports and sealing end surfaces, the four-way valve solves the problems that a backflush effect is affected by insufficient inflow rate during backflush of a four-way valve in the prior art, the distribution of the relative positions of three ports of the valve body is single, and sealing is difficult.

6 Claims, 6 Drawing Sheets

(56) References Cited

U.S. PATENT DOCUMENTS

| | | | |
|---|---|---|---|
| 5,374,351 A | | 12/1994 | Bolton et al. |
| 5,375,622 A | * | 12/1994 | Houston ............... F16K 11/076 |
| | | | 137/240 |
| 6,810,911 B2 | | 11/2004 | Hirota et al. |
| 9,004,106 B2 | * | 4/2015 | Schlichter ............... F16K 31/44 |
| | | | 137/637 |
| 9,222,597 B2 | * | 12/2015 | Asokan .................... F16K 31/44 |
| 2002/0005221 A1 | * | 1/2002 | Sisk ...................... F25B 41/046 |
| | | | 137/625.43 |
| 2008/0142099 A1 | * | 6/2008 | Yoshimura ............ F25B 41/046 |
| | | | 137/625 |
| 2013/0180908 A1 | | 7/2013 | Chancellor |

FOREIGN PATENT DOCUMENTS

| | | |
|---|---|---|
| CN | 103603969 A | 2/2014 |
| CN | 207080647 U | 3/2018 |
| JP | 09255081 A | 9/1997 |

\* cited by examiner

FOUR-WAY VALVE FOR BACKFLUSH FILTER SYSTEM

CROSS-REFERENCE TO RELATED APPLICATIONS

This application is a continuation of International Patent Application No. PCT/CN2018/079223 with a filing date of Mar. 16, 2018, designating the United States, now pending, and further claims priority to Chinese Patent Application No. 201710194602.9 with a filing date of Mar. 28, 2017. The content of the aforementioned applications, including any intervening amendments thereto, are incorporated herein by reference.

TECHNICAL FIELD

The present invention relates to a four-way valve for a backflush filter system, which is mainly used in a backflush filter system. The backflush filter system is used for removing solid impurities from the liquid, or removing solid particles or droplets from the gas. Considering the habit of using words, the word "water" is used herein to represent the fluid.

BACKGROUND OF THE PRESENT INVENTION

The Chinese invention patent ZL201110353118.9 describes a four-way valve for a backflush filter system, which solves the problem of extreme complexity of the existing backflush filter system. However, this four-way valve has some disadvantages. For example, the flow channel area of inflow and outflow becomes smaller during backflush, which affects the backflush effect. For example, a triangle formed by the center points of three radial ports of the valve body is a regular triangle, which affects the design flexibility of the valve, especially when an integral backflush system is designed.

SUMMARY OF PRESENT INVENTION

The technical problem to be mainly solved by the present invention is to provide a four-way valve for a backflush filter system, so as to solve the problems of the existing similar valves that the flow channel area becomes smaller and the distribution of the relative positions of three radial ports of the valve body is single during backflush.

According to the present invention, the technical problems are solved by the subjects of independent claims. Preferred embodiments are dependent on the subjects of independent claims. The technical solution is as follows: a four-way valve for a backflush filter system is provided. The backflush filter system (1) is mainly used for removing impurities from liquid or gas; the four-way valve comprises a valve body (3) and a rotating valve core (2) having a valve rod at one end of a central shaft; a valve core port IV (6) is arranged at the other end of the central shaft of the valve core (2); three ports are arranged in the radial direction of the valve core (2): a valve core port I (13), a valve core port II (14) and a valve core port III (15); the valve core port IV(16) is communicated with the valve core port I (13) to form a flow channel; the valve core port II (14) is communicated with the valve core port III (15) to form a flow channel; the two flow channels are respectively used for water intake and sewage drainage and are not communicated with each other; the valve body (3) encasing the valve core (2) also has four ports; three radial ports are respectively a valve body port I (9), a valve body port II (10) and a valve body port III (11), and the other port is an axial valve body port IV (12); the valve body port I (9) and the valve body port III (11) are respectively connected with two filter units I (4) and II (7); the valve body port II (10) and the valve body port IV (12) are respectively connected with a sewage drainage port or a water inlet; the valve core port IV (16) is communicated with the valve body port IV (12); when the valve body port IV (12) is used for connecting a water inlet, a flow channel formed by communicating the valve core port IV (16) with the valve core port I (13) is a water inlet channel, and a flow channel formed by communicating the valve core port II (14) with the valve core port III (15) is a sewage draining channel; at least one of the valve body port I (9), the valve body port III (11) and the valve core port I (13) is larger than the smaller of the valve core port IV (16) and A; A is the minimum cross-sectional area of the flow channel before the valve core port IV (16); when the valve body port II (10) is used for connecting the water inlet, a flow channel formed by communicating the valve core port II (14) with the valve core port III (15) is a water inlet channel, and a flow channel formed by communicating the valve core port IV (16) with the valve core port I (13) is a sewage drainage channel; at least two of the valve body port I (9), the valve body port II (10), the valve body port III (11), the valve core port II (14) and the valve core port III (15) are larger than the smaller of the valve body port II (10) and A; and A is the minimum cross-sectional area of the flow channel before the valve body port II (10).

The valve core (2) is rotated to enable the intake water to enter one of the filter units, and the sewage drainage channel is not connected. The filter unit is in a filtration working state. A clean water valve is closed. When the valve core (2) is rotated to a proper position, the intake water enters one of the filter units, and the sewage drainage channel is connected with the other filter unit and the sewage drainage port; and the system is in a backflushed state.

In actual production, hard seals of cylinders, cones or spheres have certain processing difficulty and high production cost. The effect of soft seal is unsatisfactory; the flat hard seal is good in effect and not too high in cost, and thus end surface seal is sometimes necessary to be used: a valve seat (20) is added in the valve body (3), and is fixed together with the valve body (3); the valve seat (20) has an axial flow channel communicated with the valve body port IV (12) and the valve core port IV (16); the valve seat has three end surface ports which are respectively a valve seat end surface port I (21), a valve seat end surface port II (23) and a valve seat end surface port III (25), and has three radial ports which are respectively a valve seat radial port I (22), a valve seat radial port II (24) and a valve seat radial port III (26) in a radial direction; the valve seat radial port I (22) is communicated with the valve seat end surface port I (21); the valve seat radial port II (24) is communicated with the valve seat end surface port II (23); the valve seat radial port III (26) is communicated with the valve seat end surface port III (25); the valve seat radial port I (22), the valve seat radial port II (24) and the valve seat radial port III (26) are successively in communication with the valve body port I (9), the valve body port II (10) and the valve body port III (11); the valve core port I (13), the valve core port II (14) and the valve core port III (15) of the valve core (2) are arranged on an end surface; the valve core port I (13) and the valve core port IV (16) are communicated to form a flow channel; the valve core port II (14) and the valve core port III (15) are communicated to form a flow channel; the two flow channels are respectively used for water intake and sewage drainage and are not communicated with each other; when the valve body port IV (12) is used for connecting the water inlet, a flow channel formed by communicating the valve core port I (13) with the valve core port IV (16) is a water inlet channel, and a flow channel formed by communicating the valve core port II (14) with the valve core port III (15) is a sewage draining channel; at least one of the valve seat end surface port I (21), the valve seat end surface port III (25) and the valve core port I (13) is larger than the smaller of the valve core port IV (16) and A; A is the minimum cross-sectional area of the flow channel before the valve core port IV (16); when the valve body port II (10) is used for connecting the water inlet, a flow channel formed by communicating the valve core port II (14) with the valve core port III (15) is a water inlet channel, and a flow channel formed by communicating the valve core port IV (16) with the valve core port I (13) is a sewage drainage channel; at least two of the valve seat end surface port I (21), the valve seat end surface port II (23), the valve seat end surface port III (25), the valve core port II (14) and the valve core port III (15) are larger than the smaller of the valve seat end surface port II (23) and A; and A is the minimum cross-sectional area of the flow channel before the valve seat end surface port II (23).

The integration of the four-way valve, the two filter units and the relevant pipe fittings makes the entire backflush filter system more compact and aesthetic. The flow channel area of the port entering the filter units is increased by more than one time. The valve body can adopt a "Y" type structure. The regular triangular distribution of the valve core makes the design relatively simple.

When an entire backflush filter system is designed, the flow channel area of the port entering the filter units sometimes needs to be substantially increased. In this way, it is easier to arrange the positions of the valves in the system and the directions and the angles of the ports.

The above structure allows the two filter units to be in a filtration state or a backflushed state respectively. In fact, for the users, as long as the two filter bodies can be cleanly backflushed, only one filter body can be allowed to be in the filtration state. For example, only the filter body I (5) is allowed to be in a filtration working state, and the other filter body II (8) can only provide clean water to achieve backflush for the filter body I (5) or is backflushed by the clean water supplied by the filter body I (5). In this way, the structure of the valve is simplified.

Other important features and advantages of the present invention can be found in dependent claims, the drawings and the relevant description which is made by referring to the drawings.

Apparently, the features described above and below are used not only in a specific combination in each case, but also in other combinations or separately without departing from the framework of the present invention.

Preferred exemplary embodiments of the present invention are illustrated in the drawings and the detailed description of the present invention, and the same symbols represent the same or similar or functionally identical components.

DETAILED DESCRIPTION OF PREFERRED EMBODIMENTS

Figure 1:
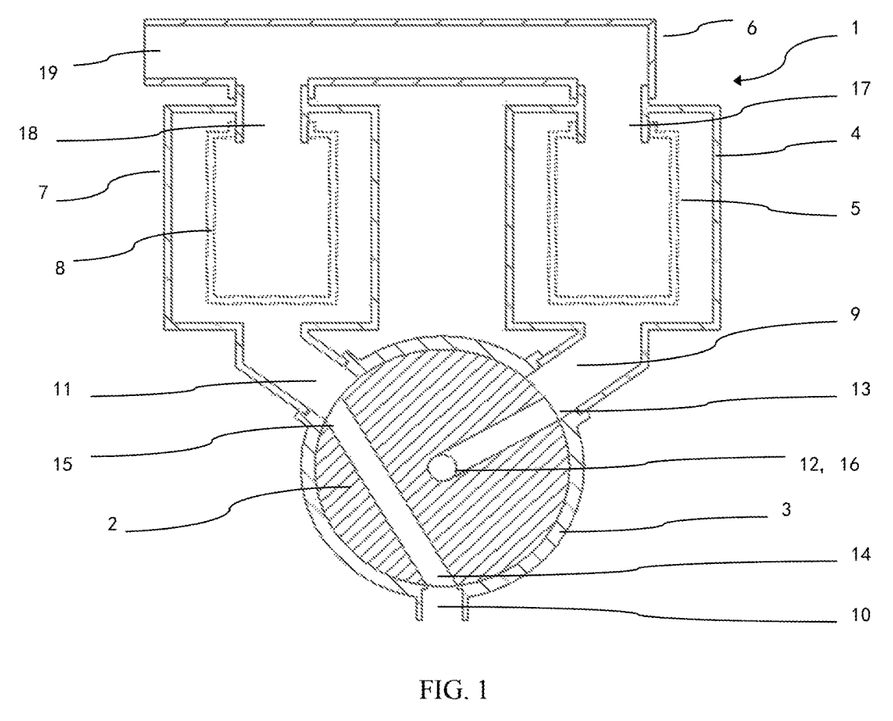
FIG. 1 schematically shows a section of a backflush filter system in which a valve body port IV (12) is a water inlet and a filter body II (8) is backflushed.

According to FIG. 1, the backflush filter system 1 comprises a four-way valve 3, a filter unit I, a filter unit I17 and a connecting element 6. A filter body I5 and a filter body II8 suitable for backflush are respectively installed in the filter unit I and the filter unit I17. The four-way valve 3 comprises a valve body 3 and a rotating valve core 2 having a valve rod at one end of a central shaft; a valve core port IV16 is arranged at the other end of the central shaft of the valve core 2; three ports are arranged in the radial direction of the valve core 2: a valve core port I13, a valve core port II14 and a valve core port II15; the valve core port IV16 is communicated with the valve core port I13 to form a flow channel; the valve core port II14 is communicated with the valve core port III15 to form a flow channel; the two flow channels are not communicated with each other; the valve body 3 encasing the valve core 2 also has four ports; three radial ports are respectively a valve body port I9, a valve body port II10 and a valve body port III11, and the other port is an axial valve body port IV12; the valve body port I9 and the valve body port III11 are respectively connected with two filter units I4 and II7; the valve body port II10 is connected with a sewage drainage port; the valve body port IV12 is connected with a water inlet; the valve core port IV16 is communicated with the valve body port IV12; at least one of the valve body port I9, the valve body port III11 and the valve core port I13 is larger than the smaller of the valve core port IV16 and A; A is the minimum cross-sectional area of the flow channel before the valve core port IV16.

The valve body port I9 and the valve body port III11 are more than one time larger than the valve body port II10 and the valve body port IV12.

A triangle formed by the center points of the valve core port I13, the valve core port II14 and the valve core port III 15 is a regular triangle.

A triangle formed by the center points of the valve body port I9, the valve body port II10 and the valve body port II11 is an isosceles triangle.

The filter unit I4 and the filter unit II7 are respectively connected with the valve body port I9 and the valve body port III11. The connecting element 6 is connected with the filter unit I17, the filter unit II18 and a filter water outlet 19, and is connected with a valve (not shown) at the filter water outlet 19.

When the valve core 2 is rotated to the position shown, the valve (not shown) connected at the filtered water outlet 19 is closed, and the water flows along the ports 12, 16, 13, 9, 5, 17, 18, 8, 11, 15, 14 and 10; impurities are discharged from the valve body port II10; and the filter body II8 is backflushed.

Figure 2:
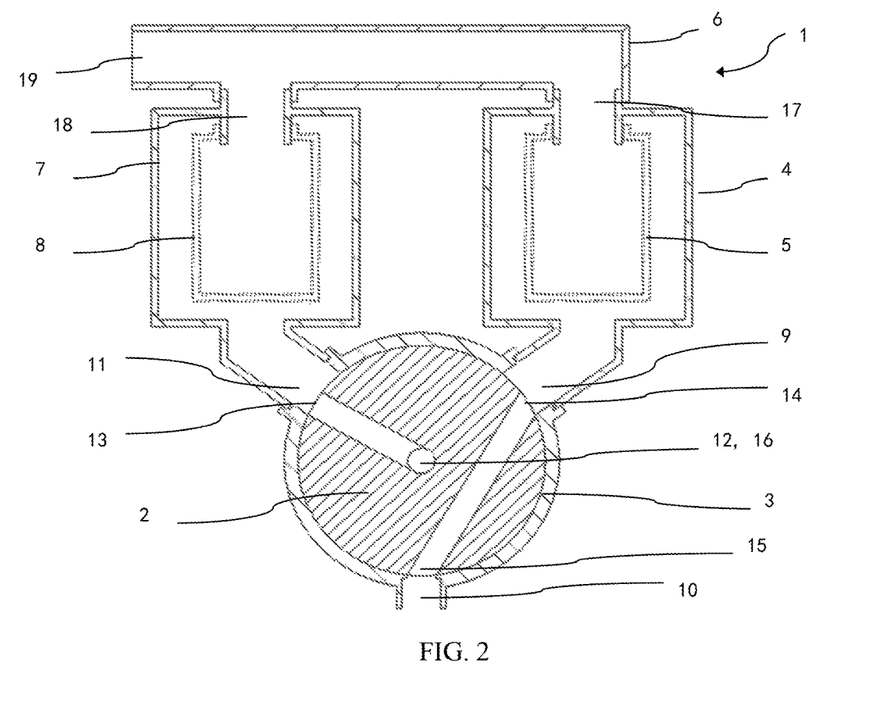
FIG. 2 schematically shows a section of a backflush filter system in which a valve body port IV (12) is a water inlet and a filter body I (5) is backflushed.

According to FIG. 2, when the valve core 2 is rotated to the position shown, the valve (not shown) connected at the filtered water outlet 19 is closed, and the water flows along the ports 12, 16, 13, 11, 8, 18, 17, 5, 9, 14, 15 and 10; the impurities are discharged from the valve body port II10; and the filter body I5 is backflushed.

Figure 3:
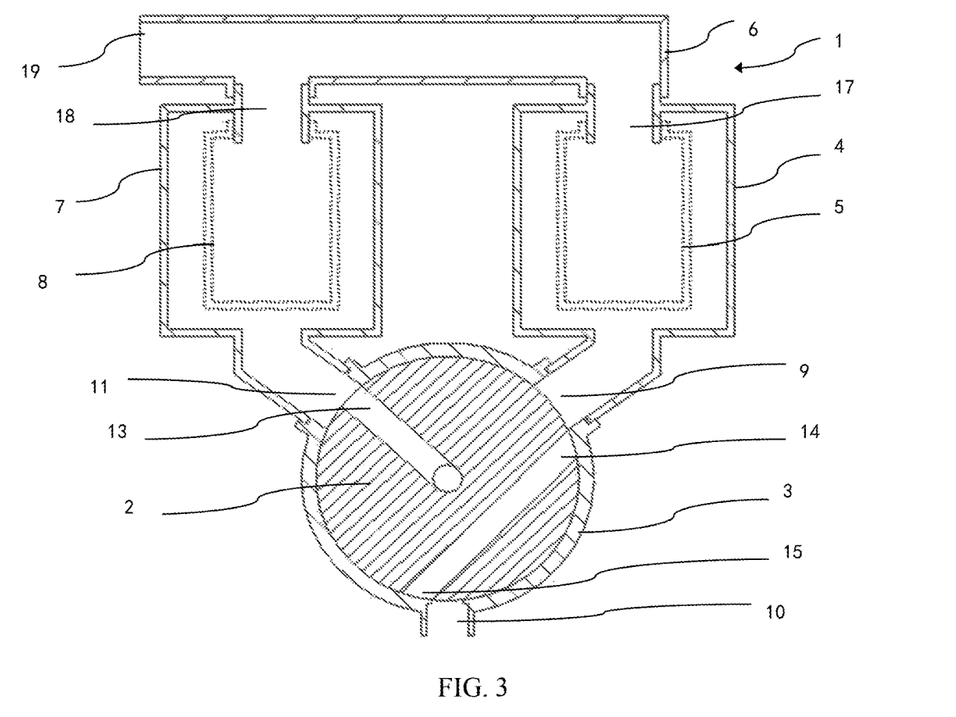
FIG. 3 schematically shows a section of a backflush filter system in which a valve body port IV (12) is a water inlet and a filter body II (8) is in a filtration state.

According to FIG. 3, when the valve core is rotated to the position shown, the sewage drainage channel is blocked; the water can only flow along the ports 12, 16, 13, 11, 8, 18 and 19; and the filter body II8 is in the filtration state.

Figure 4:
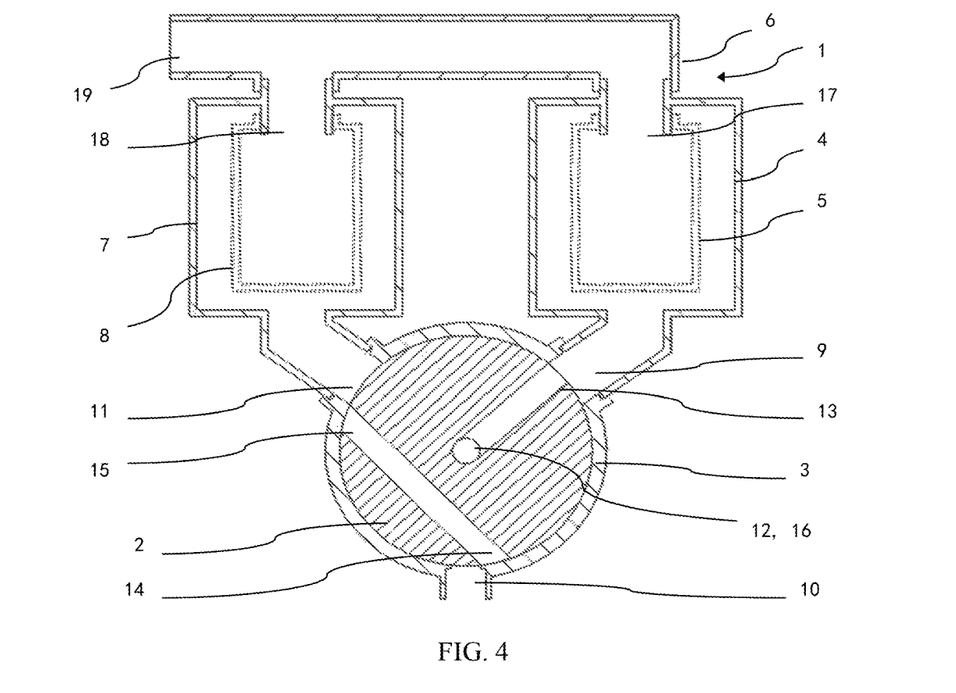
FIG. 4 schematically shows a section of a backflush filter system in which a valve body port IV (12) is a water inlet and a filter body I (5) is in a filtration state.

According to FIG. 4, when the valve core is rotated to the position shown, the sewage drainage channel is blocked; the water can only flow along the ports 12, 16, 13, 9, 5, 17 and 19; and the filter body I5 is in the filtration state.

Figure 5:
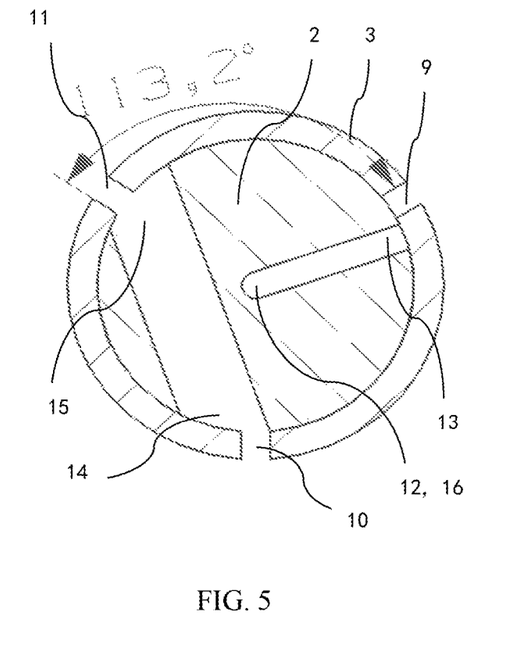
FIG. 5 schematically shows a valve section in which a valve body port II (10) is a water inlet and a filter body II (8) is in a filtration state.

According to FIG. 5, when the valve body port II10 is used as the water inlet, the valve body port IV12 is a sewage drainage port; a flow channel formed by the valve core port II14 and the valve core port III15 is a water inlet channel; a flow channel formed by the valve core port IV16 and the valve core port I13 is a sewage drainage channel; the connection with the filter units is the same as that in FIG. 4; and FIG. 5 only shows the section of the valve.

The valve core port II14 and the valve core port III15 are the water inlet of the water inlet channel and a water outlet of the water inlet channel. To ensure sufficient flow rate during switching, it is feasible to increase two ports simultaneously. As shown in the figure, the valve core port II14 and the valve core port II15 are much larger than the valve body port II10.

An angle between the valve body port I9 and the valve body port III11 is 113.2°. At least two of the valve body port I9, the valve body port II10, the valve body port III11, the valve core port II14 and the valve core port II15 are larger than the smaller of the valve body port II10 and A, and A is the minimum cross-sectional area of the flow channel before the valve body port II10, so as to possibly ensure that two filter bodies can be in the filtration state and the backflushed state and the flow rate is sufficient.

When the valve core 2 is rotated to the position shown, the sewage drainage channel is blocked; the water can only flow along the ports 10, 14, 15, 11, 8, 18 and 19; and the filter body II8 is in the filtration state.

Figure 6:
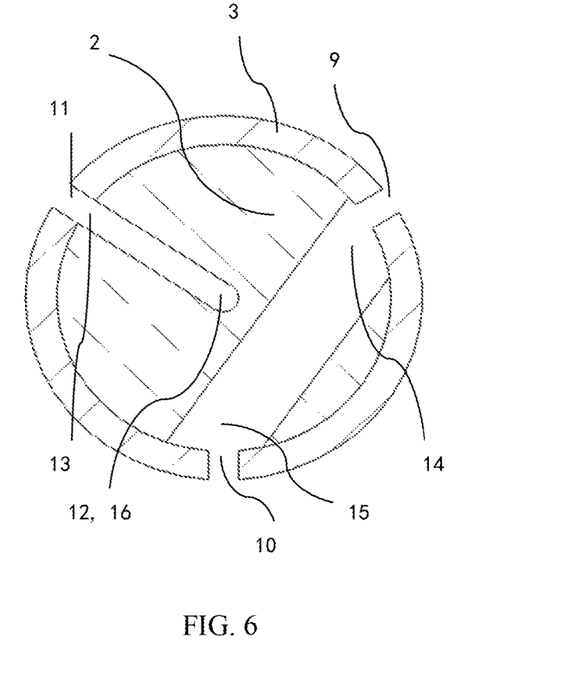
FIG. 6 schematically shows a valve section in which a valve body port II (10) is a water inlet and a filter body II (8) is backflushed.

According to FIG. 6, when the valve core 2 is rotated to the position shown, the water flows along the ports 10, 15, 14, 9, 5, 17, 18, 8, 11, 13, 16 and 12; and the filter body II8 is in the backflushed state.

Figure 7:
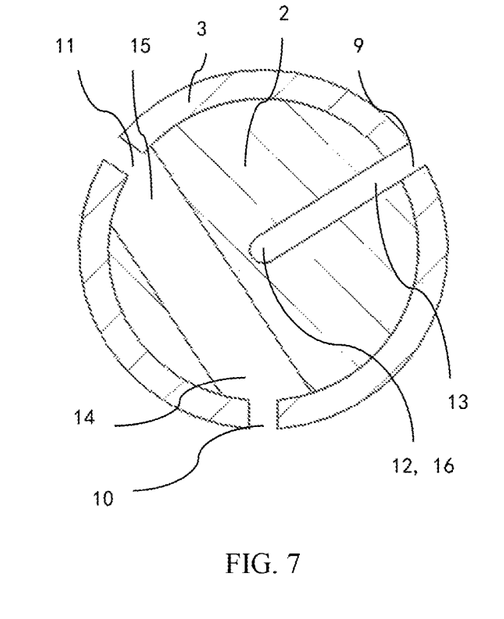
FIG. 7 schematically shows a valve section in which a valve body port II (10) is a water inlet and a filter body I (5) is backflushed.

According to FIG. 7, when the valve core 2 is rotated to the position shown, the water flows along the ports 10, 14, 15, 11, 8, 18, 17, 5, 9, 13, 16 and 12; and the filter body I5 is in the backflushed state.

Figure 8:
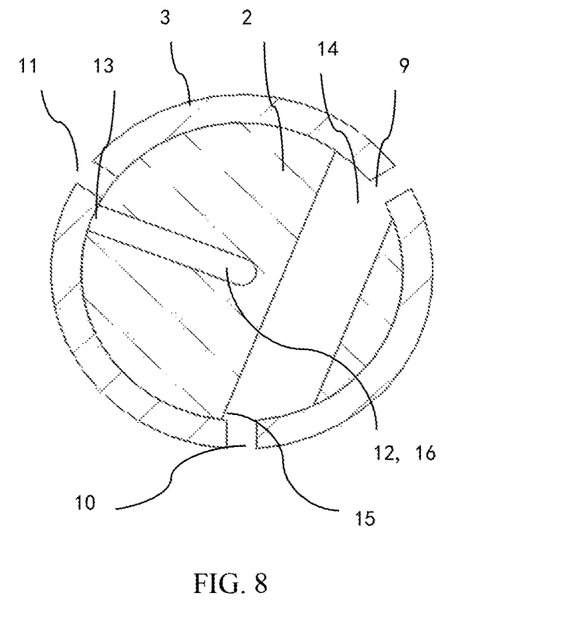
FIG. 8 schematically shows a valve section in which a valve body port II (10) is a water inlet and a filter body I (5) is in a filtration state.

According to FIG. 8, when the valve core 2 is rotated to the position shown, the sewage drainage channel is blocked; the water can only flow along the ports 10, 14, 15, 9, 5, 17 and 19; and the filter body I5 is in the filtration state.

Figure 9:
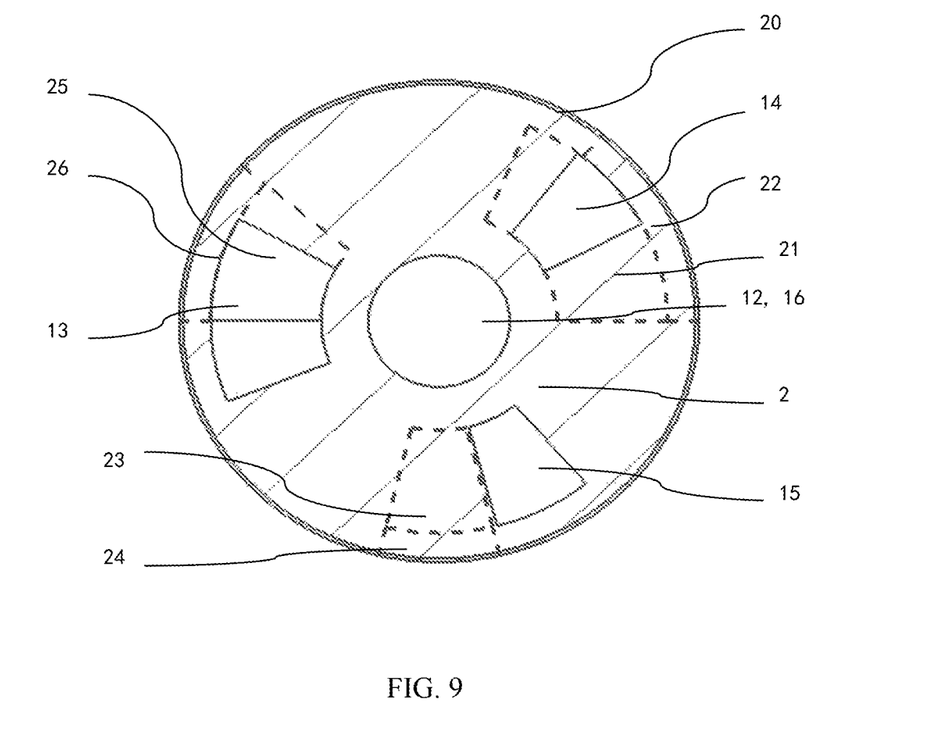
FIG. 9 schematically shows a section of an end surface seal valve in which a valve body port IV (12) is a water inlet and a filter body II (8) is in a filtration state.

FIG. 9 shows a valve core 2 which is slightly higher than the section of a sealing surface when the four-way valve adopts an end surface seal structure. A valve seat 20 matched with the valve core 2 to work is added in the valve body 3 (not shown), and the valve body 3 (not shown) is fixed together closely with the valve seat 20; the valve seat 20 has an axial flow channel communicated with the valve body port IV12 and the valve core port IV16; the valve seat has three end surface ports which are respectively a valve seat end surface port I21, a valve seat end surface port II23 and a valve seat end surface port III25, and has three radial ports which are respectively a valve seat radial port I22, a valve seat radial port II24 and a valve seat radial port III26 in a radial direction; the valve seat radial port I22 is communicated with the valve seat end surface port I21; the valve seat radial port II24 is communicated with the valve seat end surface port II23; the valve seat radial port III26 is communicated with the valve seat end surface port III25; and the valve seat radial port I22, the valve seat radial port II24 and the valve seat radial port III26 are successively in communication with the valve body port I9 (not shown), the valve body port II(10) (not shown) and the valve body port III(11) (not shown).

The valve core port I13, the valve core port II14 and the valve core port III15 of the valve core 2 are arranged on an end surface; the valve core port I13 and the valve core port IV16 are communicated to form a water inlet channel; the valve core port II14 and the valve core port III15 are communicated to form a sewage drainage channel; the two channels are not communicated with each other; the valve body port IV12 connected with the water inlet channel is a water inlet, and the valve body port II10 (not shown) connected with the sewage drainage channel is a sewage drainage port; at least one of the valve seat end surface port I21, the valve seat end surface port III125 and the valve core port I13 is larger than the smaller of the valve core port IV16 and A; and A is the minimum cross-sectional area of the flow channel before the valve core port IV16.

The valve seat end surface port I21 and the valve seat end surface port III25 are larger than the valve seat end surface port II23. In an integral backflush filter system, this design makes the arrangement of the valve core positions and the directions of the ports more flexible, thereby better satisfying the actual needs. For example, in the figure, the lower edges of the radial port I22, the valve seat end surface port I21, the valve seat radial port III26 and the valve seat end surface port III25 of the valve seat 20 are flat. This design makes the sewage drainage flow channel smooth during backflush, and can move the position of the valve core upward as much as possible closely to the two filter units, so that the entire system is more compact.

Advantages are inevitably accompanied by disadvantages. The increase in the valve seat end surface ports means that the flushing of the sealing surface by the water is increased, thereby reducing the service life of the sealing surface. Therefore, comprehensive consideration shall be made during the design.

As shown, the valve core port I13 is communicated with the valve seat end surface port III25; the sewage drainage flow channel is blocked; and the system is in the filtration state.

Figure 10:
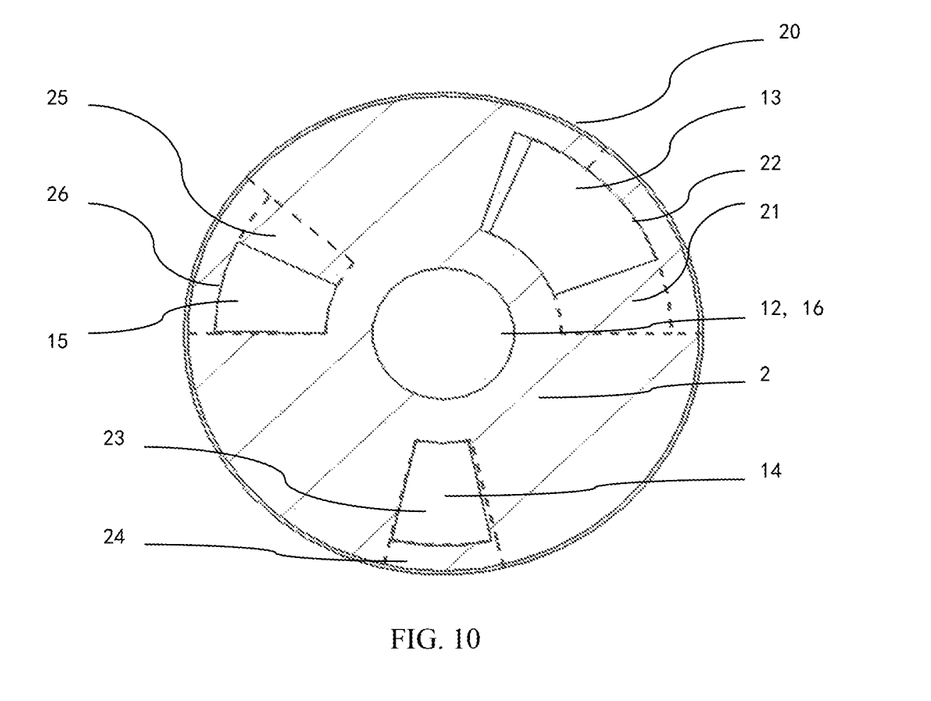
FIG. 10 schematically shows a section of an end surface seal valve in which a valve body port IV (12) is a water inlet and a filter body II (8) is backflushed.

According to FIG. 10, the valve core port I13 is communicated with the valve seat end surface port I21; the sewage drainage flow channel is unblocked; and the system is in the backflushed state.

Figure 11:
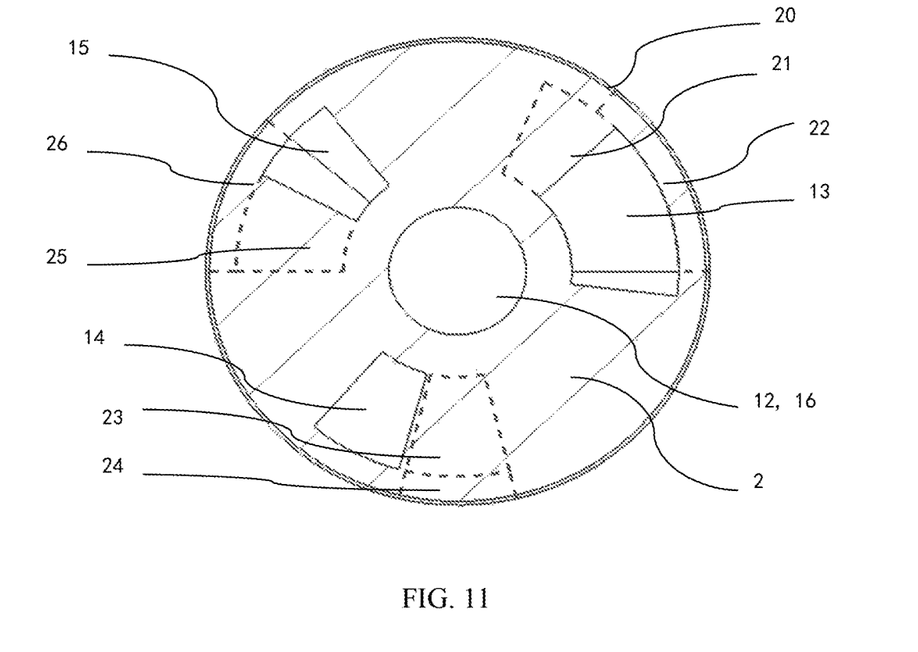
FIG. 11 schematically shows a section of an end surface seal valve in which a valve body port IV (12) is a water inlet and a filter body I (5) is in a filtration state.

According to FIG. 11, the valve core port I13 is communicated with the valve seat end surface port I21; the sewage drainage flow channel is blocked; and the system is in the filtration state.

Figure 12:
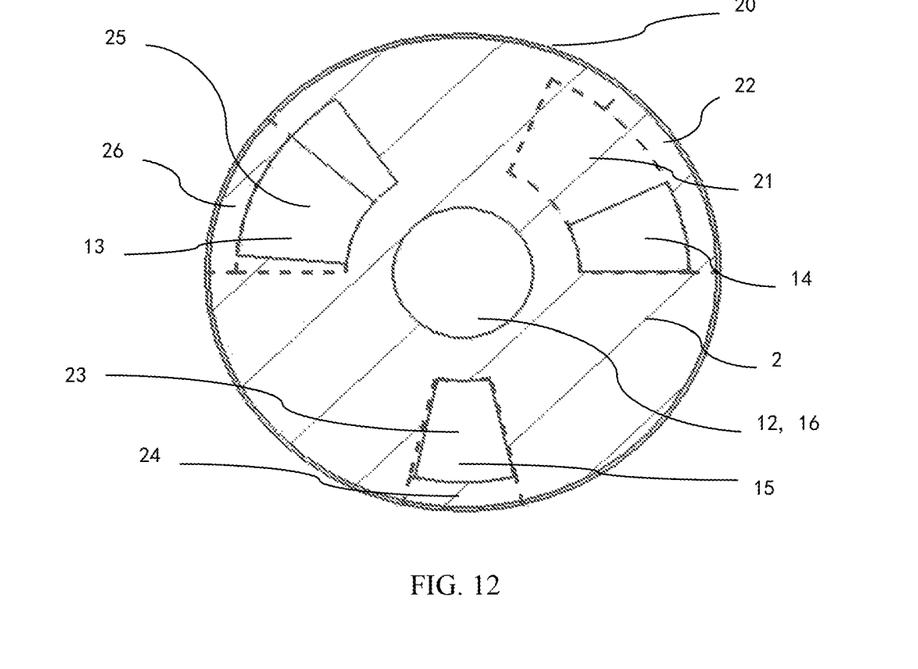
FIG. 12 schematically shows a section of an end surface seal valve in which a valve body port IV (12) is a water inlet and a filter body I (5) is backflushed.

According to FIG. 12, the valve core port I13 is communicated with the valve seat end surface port III25; the sewage drainage flow channel is unblocked; and the system is in the backflushed state.

It can be seen from simple reasoning made from the above that, in the four-way valve which adopts the end surface seal, the valve body port II10 can also be used as a water inlet, and the valve body port IV12 can be used as a sewage drainage port. At least two of the valve seat end surface port I21, the valve seat end surface port II23, the valve seat end surface port III25, the valve core port II14 and the valve core port III15 are larger than the smaller of the valve seat end surface port II23 and A; and A is the minimum cross-sectional area of the flow channel before the valve seat end surface port II23.

Figure 13:
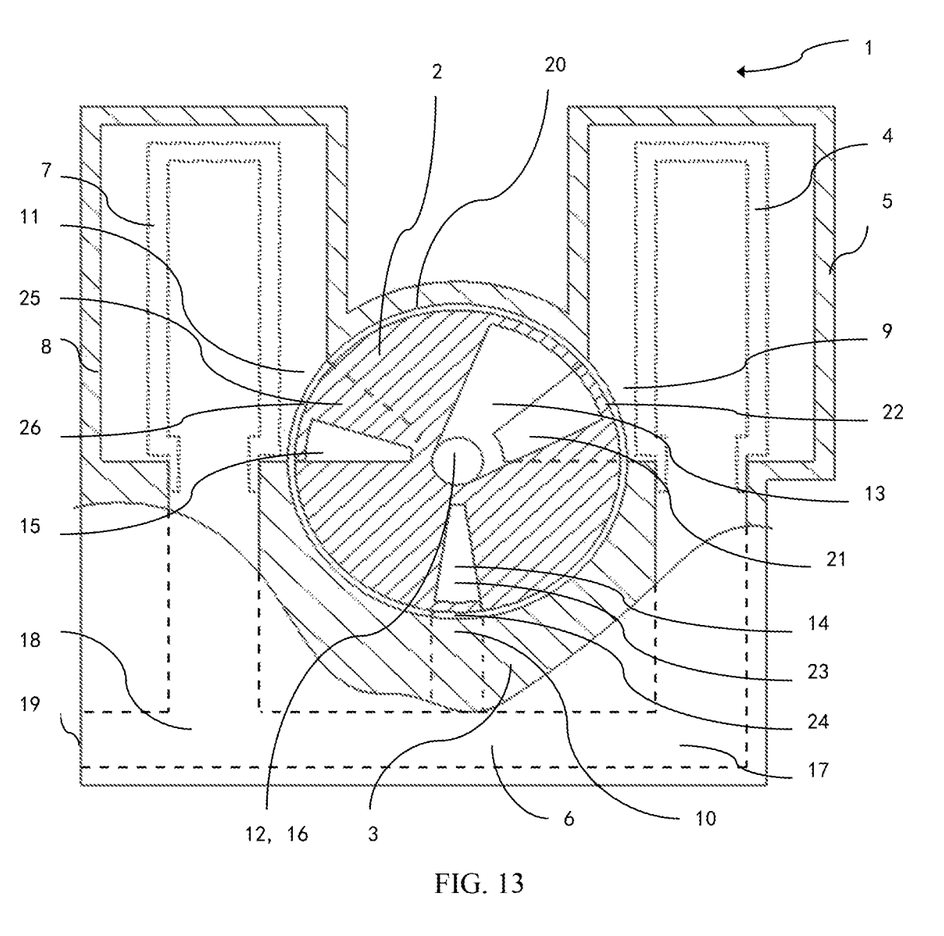
FIG. 13 schematically shows a local section of a backflush filter system which integrates a four-way valve of end surface seal, two filter units and relevant pipe fittings.

According to FIG. 13, the four-way valve of end surface seal, the two filter units and the relevant pipe fittings are integrated to form the integral backflush filter system. The system has a more compact structure and the same working principle as a split backflush filter system. Any one of the filter units can be in the filtration state or the backflushed state.

The above structure allows the two filter bodies to be in the filtration state or the backflushed state respectively. In fact, for the users, as long as the two filter bodies can be cleanly backflushed, only one filter body can be allowed to be in the filtration state. For example, only the filter body I5 is allowed to be in a filtration working state, and the other filter body II8 can only provide clean water to achieve backflush for the filter body I5 or is backflushed by the clean water supplied by the filter body I5. In this way, the structure of the valve is simplified.

A manual handle, or an electric actuator or other actuators can be installed on the valve rod for realizing automatic backflush. The automatic backflush can be conducted at regular time, or a differential pressure sensor can be installed between raw water and filtered clean water. When the value of the differential pressure sensor reaches a set value, a signal is transmitted to the actuator; and the actuator performs the backflush, and returns to a normal filtration working state after the backflush.

We claim:

1. A four-way valve for a backflush filter system, the backflush filter system (1) mainly being used for removing impurities from liquid or gas, the four-way valve comprising a valve body (3) and a rotating valve core (2) having a valve rod at one end of a central shaft, wherein a valve core port IV (16) is arranged at the other end of the central shaft of the valve core (2); three ports are arranged in the radial direction of the valve core (2): a valve core port I (13), a valve core port II (14) and a valve core port III (15); the valve core port IV (16) is communicated with the valve core port I (13) to form a flow channel; the valve core port II (14) is communicated with the valve core port III (15) to form a flow channel; the two flow channels are not communicated with each other; the valve body (3) encasing the valve core (2) also has four ports; three radial ports are respectively a valve body port I (9), a valve body port II (10) and a valve body port III (11), and the other port is an axial valve body port IV (12); the valve body port I (9) and the valve body port III (11) of the valve body (3) are respectively connected with two filter units I (4) and II (7); the other valve body port II (10) and the valve body port IV (12) are respectively connected with a sewage drainage port or a water inlet; the valve core port IV (16) is communicated with the valve body port IV (12); when the valve body port IV (12) is used for connecting a water inlet, a flow channel formed by communicating the valve core port IV (16) with the valve core port I (13) is a water inlet channel, and a flow channel formed by communicating the valve core port II (14) with the valve core port III (15) is a sewage drainage channel; at this moment, at least one of the valve body port I (9), the valve body port III (11) and the valve core port I (13) is larger than the smaller of the valve core port IV (16) and A1; A1 is the minimum cross-sectional area of the flow channel before the valve core port IV(16); when the valve body port II (10) is used for connecting the water inlet, a flow channel formed by communicating the valve core port II (14) with the valve core port III (15) is a water inlet channel, and a flow channel formed by communicating the valve core port IV (16) with the valve core port I (13) is a sewage drainage channel; at this moment, at least two of the valve body port I (9), the valve body port II (10), the valve body port III (11), the valve core port II (14) and the valve core port III (15) are larger than the smaller of the valve the valve body port 11 (10) and A2; and A2 is the minimum cross-sectional area of the flow channel before the valve body port II (10).

2. The four-way valve for a backflush filter system according to claim 1, wherein a valve seat (20) is added in the valve body (3), and is fixed together with the valve body (3); the valve seat (20) has an axial flow channel communicated with the valve body port IV (12) and the valve core port IV(16); the valve seat (20) has three end surface ports which are respectively a valve seat end surface port I (21), a valve seat end surface port II (23) and a valve seat end surface port III (25), and has three radial ports which are respectively a valve seat radial port I (22), a valve seat radial port II (24) and a valve seat radial port III (26) in a radial direction; the valve seat radial port I (22) is communicated with the valve seat end surface port I (21); the valve seat radial port II (24) is communicated with the valve seat end surface port II (23); the valve seat radial port III (26) is communicated with the valve seat end surface port III (25); the valve seat radial port I(22), the valve seat radial port II (24) and the valve seat radial port III (26) are successively in no-leakage communication with the valve body port I (9), the valve body port II (10) and the valve body port III (11); the valve body port I (9) and the valve body port III (11) of the valve body (3) are respectively connected with two filter units I (4) and II (7); the other valve body port II (10) and the valve body port IV (12) are respectively connected with a sewage drainage port or a water inlet; the valve core port I (13), the valve core port II (14) and the valve core port I (15) of the valve core (2) are arranged on an end surface; the valve core port I (13) and the valve core port IV(16) are communicated to form a flow channel; the valve core port II (14) and the valve core port III (15) are communicated to form another flow channel; the two flow channels are not communicated with each other; when the valve body port IV (12) is used for connecting the water inlet, a flow channel formed by communicating the valve core port IV (16) with the valve core port I (13) is a water inlet channel, and a flow channel formed by communicating the valve core port II (14) with the valve core port III (15) is a sewage draining channel; at this moment, at least one of the valve seat end surface port I (21), the valve seat end surface port III (25) and the valve core port I (13) is larger than the smaller of the the valve core port IV (16) and A1; A1 is the minimum cross-sectional area of the flow channel before the valve core port IV (16); when the valve body port II (10) is used for connecting the water inlet, a flow channel formed by communicating the valve core port II (14) with the valve core port III (15) is a water inlet channel, and a flow channel formed by communicating the valve core port IV (16) with the valve core port I (13) is a sewage drainage channel; at this moment, at least two of the valve seat end surface port I (21), the valve seat end surface port II (23), the valve seat end surface port III (25), the valve core port II (14) and the valve core port III (15) are larger than the smaller of the valve seat end surface port II (23) and A3; and A3 is the minimum cross-sectional area of the flow channel before the valve seat end surface port II (23).

3. The four-way valve for a backflush filter system according to claim 1, wherein the valve body (3), the valve core (2), the filter unit I (4), the filter unit II (7) and a connecting element (6) can be integrated.

4. The four-way valve for a backflush filter system according to claim 2, wherein the valve body (3), the valve core (2), the valve seat (20), the filter unit I (4), the filter unit II (7) and the connecting element (6) can be integrated.

5. The four-way valve for a backflush filter system according to claim 1, wherein the valve body port I (9) and the valve body port III (11) are more than one time larger than the valve body port II (10) and the valve body port IV (12); a triangle formed by the center points of the valve core port I (13), the valve core port II (14) and the valve core port III (15) in the radial direction is a regular triangle; and a triangle formed by the center points of the valve body port I (9), the valve body port II (10) and the valve body port III (11) is an isosceles triangle.

6. The four-way valve for a backflush filter system according to claim 1, wherein only one of a filter body I (5) and a filter body II (8), such as the filter body I (5), is allowed to be in a filtration working state, and the other filter body II (8) can only provide clean water to achieve backflush for the filter body I (5) or is backflushed by the clean water supplied by the filter body I (5).

\* \* \* \* \*